United States Patent
Miller et al.

(10) Patent No.: US 9,043,062 B2
(45) Date of Patent: May 26, 2015

(54) HYBRID ELECTRIC VEHICLE POWERTRAIN AND CONTROL SYSTEM

(71) Applicant: Ford Global Technologies, LLC, Dearborn, MI (US)

(72) Inventors: Jami J. Miller, Canton, MI (US); William Reynolds, Tecumseh (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 132 days.

(21) Appl. No.: 13/646,198

(22) Filed: Oct. 5, 2012

(65) Prior Publication Data

US 2014/0100725 A1    Apr. 10, 2014

(51) Int. Cl.

| | |
|---|---|
| *B60W 10/06* | (2006.01) |
| *B60W 10/26* | (2006.01) |
| *B60W 20/00* | (2006.01) |
| *B60W 30/18* | (2012.01) |
| *B60K 6/445* | (2007.10) |
| *B60L 15/00* | (2006.01) |
| *B60W 10/08* | (2006.01) |
| *B60W 50/00* | (2006.01) |

(52) U.S. Cl.
CPC ................ *B60L 15/00* (2013.01); *B60W 10/06* (2013.01); *B60W 10/08* (2013.01); *B60W 10/26* (2013.01); *B60W 20/00* (2013.01); *B60W 30/18* (2013.01); *Y02T 10/6239* (2013.01); *B60K 6/445* (2013.01); *B60W 2050/0047* (2013.01); *B60W 2710/083* (2013.01); *Y02T 10/7258* (2013.01)

(58) Field of Classification Search
CPC ... H03M 1/12; H03M 1/1215; H03M 1/1205; H03M 1/121; H03M 1/123; H03M 1/1255; B60W 10/06; B60W 10/26; B60W 20/00; B60W 30/18; B60K 6/445
USPC .................... 701/22; 341/141, 126, 132, 155
See application file for complete search history.

(56) References Cited

U.S. PATENT DOCUMENTS

| | | | |
|---|---|---|---|
| 4,099,107 A | | 7/1978 | Eder |
| 4,581,569 A | | 4/1986 | Fujioka et al. |
| 4,654,632 A | * | 3/1987 | Yoshida et al. ............... 341/141 |
| 5,212,483 A | * | 5/1993 | Wakimoto .................... 341/141 |
| 5,334,924 A | | 8/1994 | Kawada et al. |
| 5,552,977 A | | 9/1996 | Xu et al. |
| 6,486,809 B1 | * | 11/2002 | Figoli ........................... 341/141 |
| 7,049,778 B2 | | 5/2006 | Katanaya |
| 7,126,515 B1 | * | 10/2006 | Kris .............................. 341/141 |
| 7,426,099 B2 | | 9/2008 | Soudier et al. |
| 7,427,849 B2 | * | 9/2008 | Kaneko et al. ................ 318/801 |
| 7,576,501 B2 | | 8/2009 | Okubo et al. |

\* cited by examiner

*Primary Examiner* — Fadey Jabr
*Assistant Examiner* — Aaron L Troost
(74) *Attorney, Agent, or Firm* — David B. Kelley; Brooks Kushman P.C.

(57) ABSTRACT

In at least one embodiment, a vehicle is provided including a variable voltage controller (VVC), an electric motor configured to provide an assistive torque to an engine, and a single controller configured to read a plurality of analog signals indicative of operating conditions of the vehicle. The controller may also perform, during each of a repeating sequence of time periods, analog to digital (ATD) conversions on the analog signals, and further provide command signals to the electric motor and the VVC based on the ATD conversions and readings.

14 Claims, 1 Drawing Sheet

HYBRID ELECTRIC VEHICLE POWERTRAIN AND CONTROL SYSTEM

TECHNICAL FIELD

This disclosure relates to hybrid-electric vehicle powertrains having at least one electric machine, and the control thereof.

BACKGROUND

Battery electric vehicles (BEVs) include a traction battery that is rechargeable from an external electric power source and powers the electric machine. Hybrid-electric vehicles, or HEVs, include an internal combustion engine, one or more electric machines, and a traction battery that at least partially powers the electric machine.

Related to the sensitivity of command timing of the electric machines, it is known to employ dedicated microcontrollers to monitor and command each machine. This configuration presents limitations in the speed of communication across the various controllers. Using multiple microcontrollers further contributes to vehicle cost and package inefficiency.

SUMMARY

In at least one embodiment, a vehicle is provided including a variable voltage controller (VVC), an electric motor configured to provide an assistive torque to an engine, and a single controller configured to read a plurality of analog signals indicative of operating conditions of the vehicle. The controller may also perform, during each of a repeating sequence of time periods, analog to digital (ATD) conversions on the analog signals, and further provide command signals to the electric motor and the VVC based on the ATD conversions and readings.

In at least one embodiment, a method for controlling a power system for a vehicle at a single controller is provided. The method includes reading a plurality of analog signals indicative of operating conditions of the vehicle, performing, during each of a repeating sequence of time periods, ATD conversions on the analog signals, and providing command signals to an electric motor and VVC based on the ATD conversions and readings such that the electric motor and VVC operate according to the command signals.

In an additional embodiment, a method of controlling a plurality of electric machines is provided. The method includes receiving analog signals indicative of a status of operation of the plurality of electric machines, performing ATD conversions on the analog signals, storing peak values of the analog signals to a memory, and providing command signals such that an inverter regulates a current provided to the electric machines based on the converted digital signals. Further, the command signals are provided on predetermined schedules corresponding to each of the electric machines.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
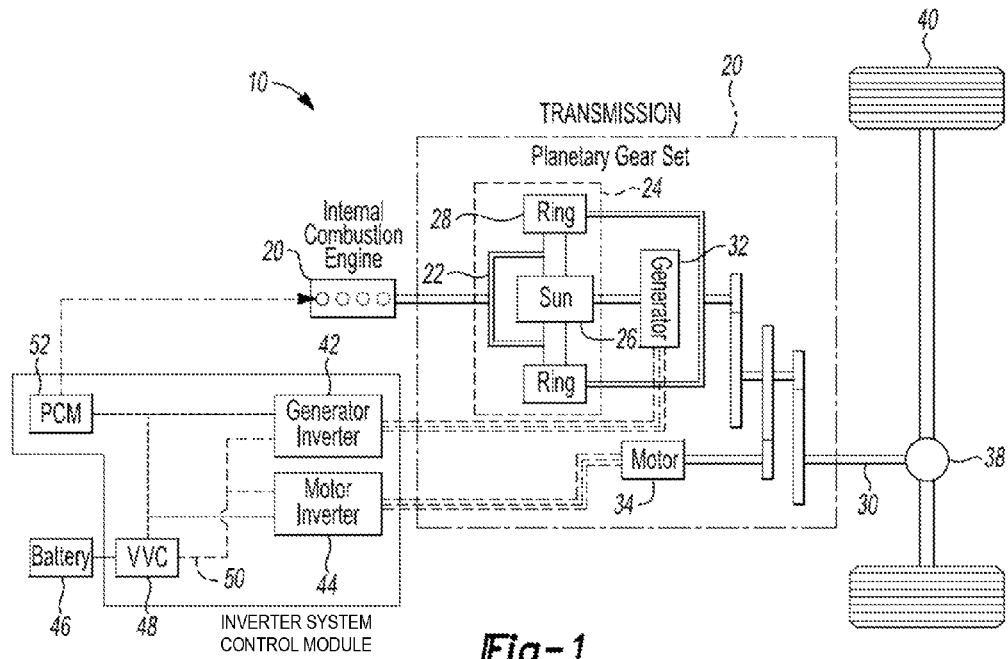
FIG. 1 depicts a schematic diagram of a hybrid-electric vehicle powertrain system.

A schematic diagram of a hybrid-electric vehicle powertrain system 10 according to the present disclosure is illustrated in FIG. 1. The claimed invention may however, be applied to other powertrain topologies. An internal combustion engine 20 drives a carrier 22 of a planetary gear set 24. The engine torque is divided by the gear set 24 between a sun gear 26 and a ring gear 28. The ring gear torque is mechanically transmitted to an output shaft 30. The sun gear torque is absorbed by an electric generator 32 in connection with the sun gear 26. An electric traction motor 34 is also driveably connected to output shaft 30. Throughout this description, the terms generator and motor are used merely as labels to identify these components. Both the generator 32 and the motor 34 are reversible electric machines capable of both converting mechanical shaft power into electrical power, and converting electrical power into mechanical shaft power. The driveshaft is driveably connected to a differential 38 which divides the power between wheels 40 while accomodating some differences in wheel speeds.

Still referring to FIG. 1, the generator 32 and the motor 34 are electrically powered through the inverters 42 and 44 respectively, via three-phase power circuits. Electrical power connections are illustrated by dashed lines with long dashes. The inverters 42 and 44 draw power from or supply power to a DC electrical bus 50. Electrical power is stored in the battery 46, and sent through a DC-DC voltage converter to modify the vehicle voltage level according to the devices being powered. The variable voltage control (VVC) 48 converts the DC voltage level of the battery 46 to the DC desired voltage level of high-voltage electrical bus 50.

The battery 46 has a two-way electrical connection, such that it receives and stores electric energy through regenerative braking, for example, and also supplies the energy to an electric machine. Electrical energy that is generated from torque absorbed by the generator 32 can be transferred to the battery 46 through electrical connections. The battery 46 supplies stored energy to the motor 34 for operation. The motor 34 uses electrical energy to provide assistive torque to the engine 20. A portion of the power delivered from the engine 20 to the generator 32 may also be transmitted directly to the motor 34.

A powertrain control module (PCM) 52 issues control signals to the VVC 48 specifying the desired voltage for the DC electrical bus 50. Control signal connections are illustrated by dashed lines with short dashes. The PCM 52 also senses voltage levels of both the battery 46 the output voltage of the VVC 48. In response to a driver input, the PCM 52 issues control command signals to the engine 20 and the inverters 42 and 44 to regulate the aggregate torque generated by the engine 20, the generator 32, and the motor 34. The PCM 52 further senses the actual output of the inverters 42 and 44. If the torque actually delivered by the motor 34 differs significantly from the requested torque, then vehicle acceleration will not match the driver's expectation. If the torque actually delivered by the generator 32 differs significantly from the requested torque, then engine speed will depart from expected behavior.

Although the vehicle powertrain system 10 is illustrated with a PCM, such a control system can include more or less than two controllers, as desired. For example, a separate battery control module (BCM) can directly control the battery 46. Furthermore, a separate motor control module can be directly connected to the motor 34 and to the other controllers in the vehicle. It should be understood that all contemplated propulsion controllers in the vehicle are each characterized in the PCM embodiment.

Electrical energy generated by the generator 32 can be provided in the form of three-phase alternating currents. Similarly, the load of the electric motor 34 may also be three-phase analog alternating current. The PCM 52 senses outputs of both the generator 32 and the motor 34 as analog signals. Other sensed values are also received by the PCM 52 in analog form. For example, the DC bus 50 voltage, the battery 46 voltage, additional vehicle on-board voltages, and a plurality of temperature sensors may all be monitored by the PCM 52. The analog signals indicative of vehicle operating conditions can be converted to digital signals for processing by microcontrollers within the PCM 52. Microcontrollers are often equipped with at most two independent analog to digital converters (ADC's). Each ADC provides an independent channel on which to perform concurrent analog to digital (ATD) conversions. Additionally, command signals for the motor and generator are generated in a digital form from the PCM 52. In order to control the motor 34, the generator 32 and the VVC 48, the ADC's must be ready to convert the sensed analog current signals associated with each of the motor 34 and generator 43, as well as sensed voltage associated with the VVC 48. In response to the monitored values, the PCM 52 issues command signals to the motor 34, the generator 32 and the VVC 48, all at a predetermined cadence. If all three devices have the same frequency, then there may not be a conflict. However, practical implementation can be such that all three devices require different command and monitoring frequencies. At least one embodiment manages the plurality of required conversions and data acquisitions using a single microcontroller. This allows for the performance of a number of concurrent ATD conversion sequences that is greater than the total number of independent channels available.

Pulse-width modulation (PWM) is employed herein to use digital control logic to provide an analog equivalence. Direct current provided from the battery 46 is transformed into a three-phase alternating current to properly power the electric machines. The disclosed microcontrollers have PWM capability built-in. The inverters 42, 44 corresponding to each of the generator 32 and the motor 34 receive digital pulse width modulated command signals from the PCM 52 for each of the three current phases for each device. A circuit within the inverters 42, 44 can include a number of switching devices that rapidly switch on and off to approximate the response of an analog alternating current output. The PCM 52 commands a variance of pulse widths for on and off periods of each of the internal switching devices. The pulse widths are modulated for each of the individual current control signals so as to simulate AC waveforms for each of the three-phase supply currents. The PCM 52 further provides a digital command signal to the VVC 48 to control the degree of voltage conversion. Related to the rate at which the ADC's perform, it is common to have three separate microcontrollers control each of the motor, generator, and VVC. However, this approach adds cost and requires more package space due to the additional hardware. It can be beneficial to configure a single microcontroller to conduct the conversions for the plurality of electrical machines.

Unique scheduling of ATD conversions can be described as ratios of a unit time period so as to allow multiple conversions to be performed by the same processor while avoiding timing conflicts. The timing requirements for periodic conversions of the three-phase currents of the generator and motor differ from the conversion requirements of the variable voltage controller. A programmable timing peripheral can be used to schedule the conversions using timing counts to track requirements for each component. The timing peripheral facilitates predetermined schedules for storing analog readings, performing the ATD conversions, as well as generating PWM waveforms. The signals read from the electric drive devices are stored in a memory of the PCM. The phase current readings require ATD conversion when they are needed with no conflict. The timing peripheral employs an internal timing cycle referred to as a tick. The ticks represent individual counts or steps within a tick time period. A unit time tick period is typically short, and in at least one embodiment, is set to 15 µs. Each of the time tick periods has a substantially similar duration. However the tick period can be set to a larger interval, for example 30 µs, depending on the nature of the application. The time tick periods are repeated in sequences comprising an overall schedule. The PWM periods for the motor 34, generator 32, and the VVC 48 are set as ratios of unit time tick periods. For example, if the motor period is desired to be 90 µs and the tick period is 15 µs, the period ratio needed would be 6.0 (15 µs×6=90 µs). Due to the granularity of the tick period, the resulting PWM period may not be exactly as specified, but can be acceptable for the given application. Within each tick period, the scheduled ATD conversions are performed in an intermingled fashion. At distinct predetermined ratios of tick periods, the PCM can convert each of the three-phase currents for the motor, the three-phase currents of the generator, and the inductor current. In this way, different conversion and/or command schedule frequencies corresponding to a plurality of devices can be accommodated on a single micocrontroller.

TABLE 1

Generic 15 µs conversion sequence

| Time Line | Trigger Event | ADC Channel 1 | ADC Channel 2 |
| --- | --- | --- | --- |
| 0 | Generator Counter | Generator Phase Current A | Generator Phase Current B |
| 0 + one ATD Conversion time period | | OPEN | Generator Phase Current C |
| 6 µs | Motor Counter | Motor Phase Current A | Motor Phase Current B |
| 6 µs + one ATD Conversion time period | | Motor Phase Current C | OPEN |
| 12 µs | VVC Counter | OPEN | Inductor Current |

Table 1 above illustrates a generic example of an ATD conversion sequence performed with a predetermined tick period. This scheme assumes that the microprocessor has two independent ADC channels that can be setup to independently convert signals in a sequence. The conversions are prompted by trigger signals from the component counter of the timing peripheral which correspond to scheduled events.

The timing peripheral processing unit can include counters associated with each of the devices that require commands and/or readings on a cadence. Analog readings from other devices that are not required to be on a particular cadence can be scheduled for ATD conversion during open time segments that are not subscribed to by devices with required timing cadences. Each ATD conversion may complete in approximately 2.5 μs. It can be seen from Table 1 that there are three open positions available within the sequence to convert analog signals indicative of additional vehicle operating conditions. The additional device readings may be interleaved between other schedules having a higher timing priority. The number of additional signals desired to be converted may influence the total number of sequences selected for an overall conversion strategy. Considering the generic sequence of Table 1 for example, in order to perform ATD conversions for ten additional signals, four total sequences having an aggregate twelve available positions would be required. It is contemplated that a different number of periodic device conversions may influence the number of available positions within a given time period sequence.

sions are completed, and then the third phase signal conversion is performed. At this point, there is an additional open position wherein a reading is taken indicative of a second temperature. The temperature readings may be suitable to indicate a thermal status of any given device that is relevant to operation of the hybrid-electric powertrain system. For example, the battery temperature, power supply level, and motor temperature can each be suitable inputs to the open positions of the above sequence.

As can be seen from Sequence #2 and Sequence #3 according to Table 2, the counter of the timing peripheral cycles through a protocol intermingling each of the schedules of the motor, generator and VVC. Both of the Sequence #2 and Sequence #3 additionally have open positions that are utilized by the monitoring of voltage at various locations within the powertrain system as well as power supply monitoring. Any number of data signals may be suitable as inputs within the open positions of the various sequences for controller algorithms to consider for powertrain performance.

Frequencies and/or phases corresponding to each of the ATD conversions of the three driving components may differ

TABLE 2

Sequences #1 through #3 of a conversion sequence example implementation.

| | Time Line | Trigger Event | ADC Channel 1 | ADC Channel 2 |
|---|---|---|---|---|
| Sequence #1 | 0 | Generator Counter | Generator Phase Current A | Generator Phase Current B |
| | 0 + one ATD Conversion time period | | Temperature 1 | Generator Phase Current C |
| | 6 μs | Motor Counter | Motor Phase Current A | Motor Phase Current B |
| | 6 μs + one ATD Conversion time period | | Motor Phase Current C | Temperature 2 |
| | 12 μs | VVC Counter | Inductor Current | Voltage 1 |
| Sequence #2 | 15 μs | Generator Counter | Generator Phase Current A | Generator Phase Current B |
| | 15 μs + one ATD Conversion time period | | Generator Phase Current C | Voltage 2 |
| | 21 μs | Motor Counter | Motor Phase Current A | Motor Phase Current B |
| | 21 μs + one ATD Conversion time period | | Motor Phase Current C | Voltage 3 |
| | 27 μs | VVC Counter | Inductor Current | Power Supply 1 |
| Sequence #3 | 30 μs | Generator Counter | Generator Phase Current A | Generator Phase Current B |
| | 30 μs + one ATD Conversion time period | | Power Supply 2 | Generator Phase Current C |
| | 36 μs | Motor Counter | Motor Phase Current A | Motor Phase Current B |
| | 36 μs + one ATD Conversion time period | | Motor Phase Current C | High Voltage Power Supply |
| | 42 μs | VVC Counter | Battery Voltage | Inductor Current |

Table 2 above shows conversions of a three-sequence scheduling strategy according to at least one embodiment of the present disclosure. It is contemplated that scheduling strategies can have any number of successive sequences to provide flexibility of device monitoring while supporting timing requirements. Considering the above three-sequence configuration, this embodiment shows a capability to convert nine (3×3) additional signals beyond that of the motor, generator, and VVC. The cycle can be triggered by the generator counter of the timing peripheral. Once initiated, conversions of the generator phase A and phase B currents on ADC Channels 1 and 2 respectively, begin at time zero. Once the first conversion set is complete, control signals are transmitted to the inverters based on the sensed values, and the microcontroller progresses to the second step in the sequence to convert the generator phase C current. At the second step within the sequence, there is an accommodation for a first temperature signal reading. The third step in the first sequence can be triggered by the motor counter, and includes ATD conversions of each signal of the motor three-phase currents. In similar fashion, two of the three-phase current signal converfrom each other, therefore the positions of given conversions can occur on different channels and/or positions across the sequences. As mentioned above, the programmable schedule is flexible to accommodate converting data in different positions within a given sequence to the extent that command information is still provided to the corresponding devices at required times.

Figure 2:
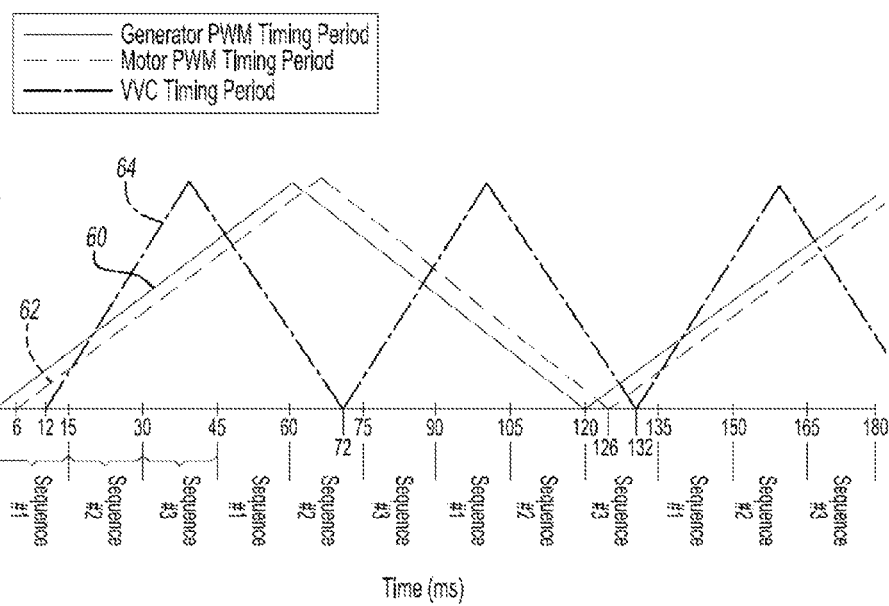
FIG. 2 depicts a timeline plot of a scheduling sequence.

FIG. 2 is a time plot showing an embodiment implementing the timing strategy according to the above description. A periodic cycle is shown for each of the conversions required for the motor, the generator, and the VVC. The waveforms for each device are shown having staggered phases and/or different periods. In the present embodiment, the generator waveform 60 and the motor waveform 62 both have a tick period ratio of 8.0 (15 μs×8=120 μs), however there is a lag between the two signals. At the same instance, the VVC waveform 64 is depicted with a unique period having a tick period ratio of 4.0 (15 μs×4=60 μs). Multiple ATD sequences are cycled through until all ATD sequences are read. As can be seen in the example implementation of FIG. 2, the cadence of sequences repeats after the third sequence. The lag between the waveforms of the motor and the generator represents a phase shift between the waveforms. Further, the VVC waveform alternates twice as often as the three-phase currents of the generator and motor, showing a unique waveform period. The maximum and minimum peaks of each waveform can therefore occur at different times during the process. The waveforms depicted are shown having example periods, however periods used in actual implementation may differ.

In at least one embodiment, all current sensors are read every tick period. However, only the current sensor readings that correspond to maximum or minimum peak values of each waveform are stored to memory and subsequently used for further processing. The stored current sensor readings are used for calculations to determine commands for each electric device. The storing of only those peak value readings which hold higher importance can require dedicated software. The software includes functions to generate the PWM signals to induce alternating supply current waveforms, and also to control the ATD conversions corresponding to each of the motor, the generator and the VVC such that each conversion does not create a timing conflict.

In a further embodiment, a method for retaining the peak values associated with PWM waveforms is presented. A first direct memory access (DMA) transfer of data occurs after every ATD conversion completes. The first DMA transfer copies the results of the ATD conversions to a first memory storage location. A second DMA transfer is selectively triggered by the timing peripheral and transfers values from the first memory location to a second memory location. Based on the configuration of the schedule within the timing peripheral, the second DMA transfer only occurs at the middle or end of the PWM waveform periods. The second DMA transfer ensures that the controller retains the maximum and minimum peak values of the waveforms of the PWM period for subsequent use during processing.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a variable voltage controller (VVC);
an electric motor configured to provide an assistive torque to an engine; and
a single controller configured to
read a plurality of analog waveform signals from the motor, the VVC and at least one analog signal from another device,
perform, during each of a repeating sequence of time periods, analog to digital (ATD) conversions on each of the analog signals of the motor, the VVC, and another device at a cadence determined by a timing of peaks of the waveform signals, and
provide command signals to the electric motor and the VVC based on the ATD conversions and readings,
wherein each of the time periods includes a series of tick periods and, in response to each tick period, the signal controller performs two ATD conversions on the analog waveform signal of the motor, performs an ATD conversion on each of the analog signals of the motor and the another device, or performs an ATD conversion on each of the analog signals of the VVC and the another device.

2. The vehicle of claim 1 wherein the single controller includes a number of independent channels and is further configured to concurrently convert a number of analog signals that is greater than the number of independent channels.

3. The vehicle of claim 1 wherein the another device is indicative of a vehicle operating condition.

4. The vehicle of claim 1 wherein the time periods are of substantially equal duration.

5. The vehicle of claim 1 wherein a duration of each of the time periods is based on periods of interleaved waveforms of alternating current provided to the electric motor.

6. The vehicle of claim 5 wherein the single controller is further configured to store peak values for the waveforms.

7. A method for controlling a power system for a vehicle comprising:
by a single controller,
reading a plurality of analog waveform signals indicative of operating conditions of the vehicle,
performing, during each of a repeating sequence of time periods, analog to digital (ATD) conversions on each of the analog signals at a cadence determined by a timing of peaks of the waveform signals,
providing command signals to an electric motor, variable voltage controller (VVC), and another device based on the ATD conversions, and
operating the electric motor, VVC and device based on the command signals,
wherein each of the time periods includes a series of tick periods and during each tick period, the single controller performs two ATD conversions on the analog signals for the electric motor, performs an ATD conversion on each of the analog signals for the electric motor and the another device, or performs an ATD conversion on each of the analog signals for the VVC and the another device.

8. The method of claim 7 further comprising, at the single controller, reading an additional analog signal indicative of a vehicle operating condition while performing only one ATD conversion on the analog signals.

9. The method of claim 7 wherein the time periods are of substantially equal duration.

10. The method of claim 7 wherein a duration of each of the time periods is based on periods of interleaved waveforms of alternating current provided to the electric motor.

11. The method of claim 10 further comprising, at the single controller, storing peak values for the waveforms.

12. A method of controlling a plurality of electric machines using a single controller comprising:
- performing, during each of repeating time periods, analog-to-digital conversions on analog signals from each of the electric machines and another device;
- during each tick period of the time periods, providing two command signals for an electric machine or for each of an electric machine and the another device; and
- operating the plurality of electric machines based on the command signals.

13. The method of claim 12 further comprising generating predetermined schedules for the analog-to-digital conversions such that unique schedule frequencies for each of the plurality of electric machines are accommodated on a single microcontroller.

14. The method of claim 12 wherein the command signals are provided on interleaved predetermined schedules each having a distinct timing period corresponding to each electric machine.

* * * * *